(No Model.) 2 Sheets—Sheet 2.
W. HUGGINS.
SEED DRILL.
No. 414,707. Patented Nov. 12, 1889.
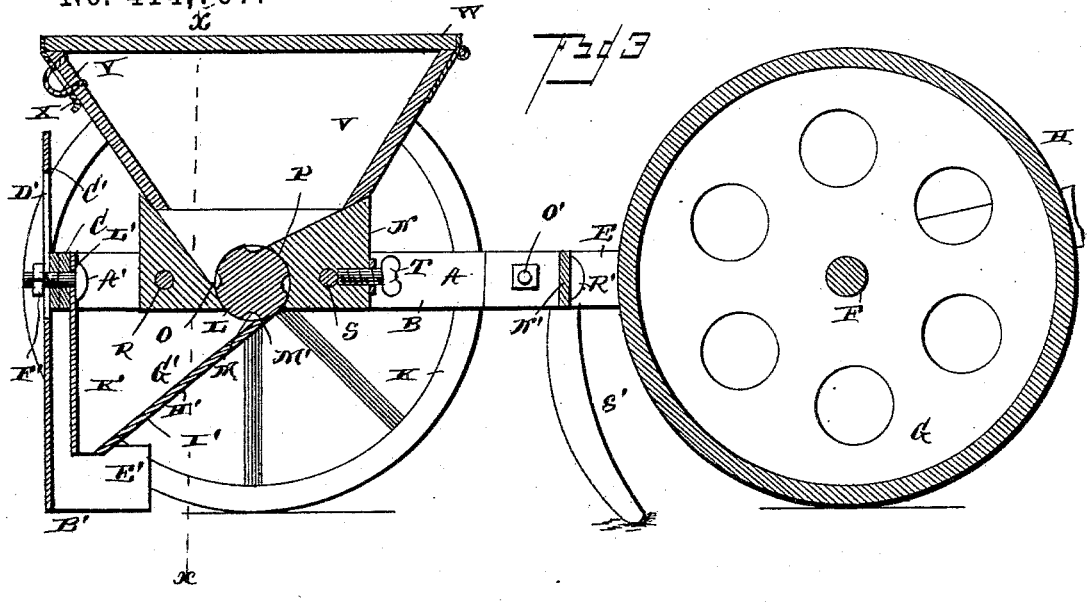
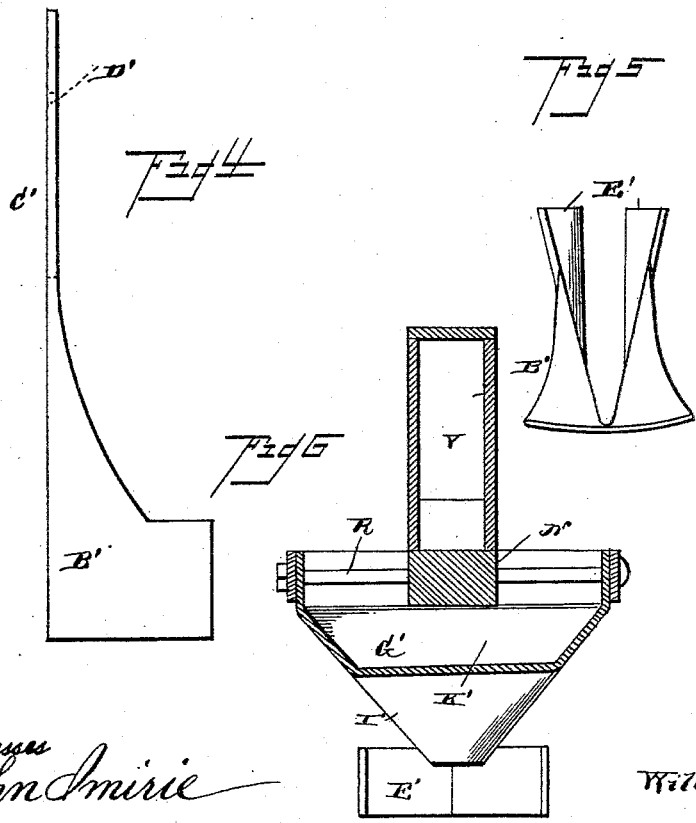
Witnesses
John Imirie
Wm. Bagger
Inventor
William Huggins
By his Attorneys

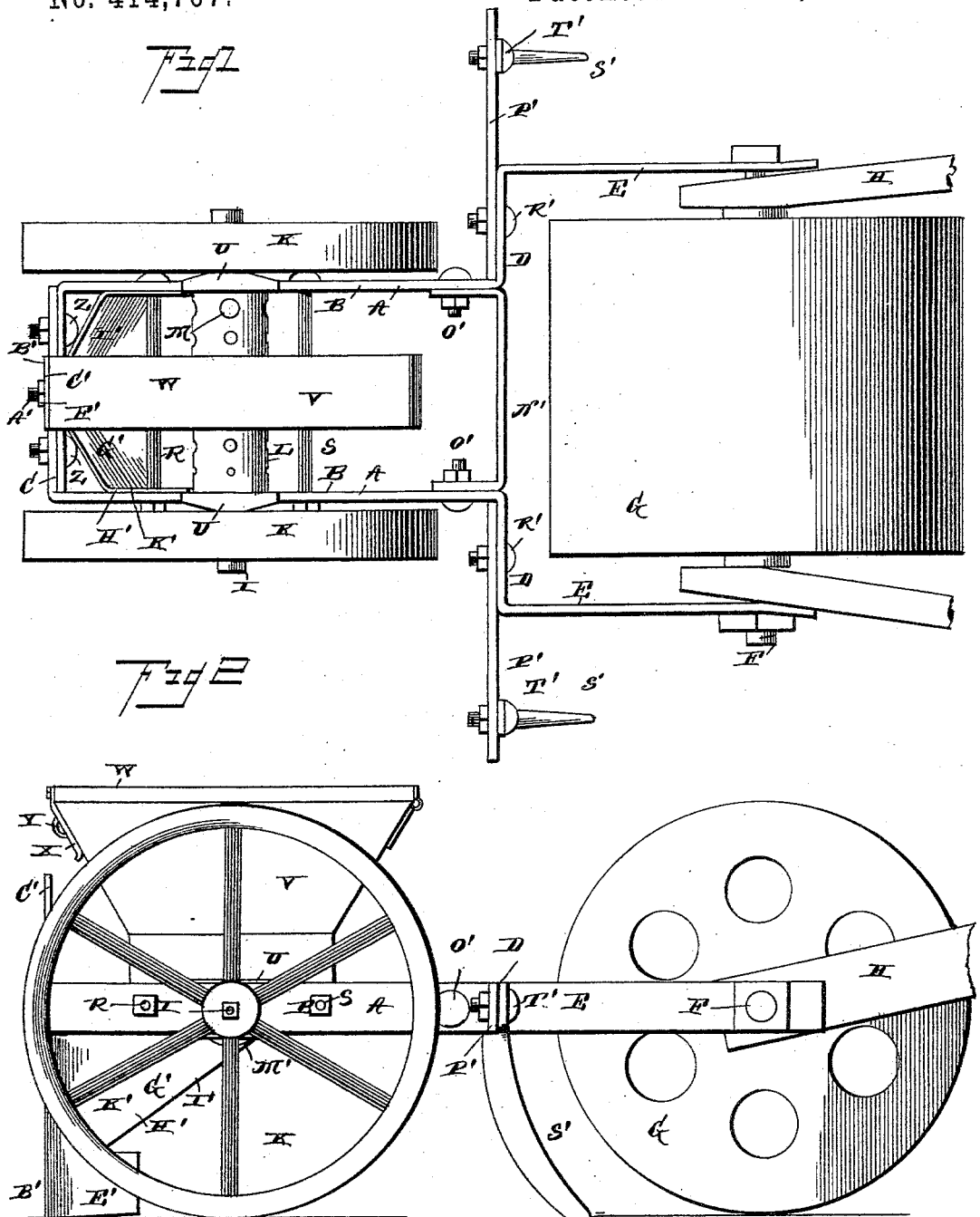

UNITED STATES PATENT OFFICE.

WILLIAM HUGGINS, OF BUSHNELL, MICHIGAN.

SEED-DRILL.

SPECIFICATION forming part of Letters Patent No. 414,707, dated November 12, 1889.

Application filed March 26, 1889. Serial No. 304,805. (No model.)

*To all whom it may concern:*

Be it known that I, WILLIAM HUGGINS, a citizen of the United States, residing at Bushnell, in the county of Montcalm and State of Michigan, have invented a new and useful Improvement in Seed Drills and Rollers, of which the following is a specification.

My invention relates to an improvement in seed drills and rollers; and it consists in the peculiar construction and combination of devices that will be more fully set forth hereinafter, and particularly pointed out in the claims.

In the drawings, Figure 1 is a top plan view of a seed drill and roller embodying my improvements. Fig. 2 is a side elevation of the same. Fig. 3 is a vertical longitudinal sectional view. Figs. 4 and 5 are detail views. Fig. 6 is a vertical transverse sectional view taken on the line $x\,x$ in Fig. 3.

A pair of bars A are bent to form parallel side beams B, and have their front ends bent at right angles to form overlapping transverse bars C. The rear ends of the said bars A are bent outward at right angles to form offsets D, and from said offsets extend rearward-projecting arms E. In the latter is journaled a shaft F, to which is secured a hollow cylindrical roller G, and on the spindles of the shaft and between the ends of the roller and the inner sides of the arms E are pivoted handles or beams H, which diverge rearwardly, and said beams or handles are connected together at a suitable distance from their rear ends by means of a pair of transverse boards of suitable length, which may be screwed or bolted to opposite sides of the beams in the manner shown and described in Letters Patent of the United States No. 395,784, granted to me January 8, 1889.

A shaft I is journaled in bearings in the side beams B at a suitable distance from the front ends thereof, and to the spindles of the said shaft are secured a pair of driving and supporting wheels K. Secured on the said shaft is a cylindrical seed-roller L, which is provided with a series of peripheral seed cups or recesses M, which are of different sizes and are adapted for planting different kinds of seeds. A casting or block N, of suitable size and shape, has a discharge-opening O in its lower side near its center, a concave recess P in its under side, which is adapted to fit snugly on the upper side of the seed cylinder or roller, and the said block or casting is hollow and has its inner side converging downward toward the opening O, as shown. Transverse openings are made in the block or casting near the ends thereof, and a pair of bolt-rods R S extend transversely through the bars B and through the said openings, and serve to support the block or casting in place and permit the same to be adjusted laterally, so that its discharge-opening O may be caused to register with seed cups or openings M of any desired size. A set-screw T works in a threaded opening in the rear end of the block or casting and is adapted to engage the bolt-rod S, and thereby serves to clamp the block or casting at any desired adjustment. Washers U are fitted on the inner ends of the spindles of shaft I and have longitudinal recesses on their inner sides, which receive the bars B. The said washers prevent the wheels K from slipping laterally on the shaft-spindles.

The hopper V has downward-converging front and rear sides, and said hopper is long and narrow, and its lower edges are adapted to be fitted in the block or casting M'. The cover W of the said hopper is hinged thereon, as shown, and is provided with a hasp X, adapted to engage a keeper Y, which projects from the front side of the hopper.

The overlapping arms C are secured together by clamping-bolts Z, which pass through registering openings in said arms, and a clamp-bolt A' passes through central registering openings in said arms, as shown.

The drill-tooth B' is made from a single piece of plate metal, has a vertical standard C', provided with the vertical adjusting-slot D', and at the lower end of the said drill-tooth are rearward-extending diverging wings E'. The rear side of the drill-tooth is open. The slot D' thereof is engaged by the bolt A', and a nut F' is screwed on said bolt and serves to clamp the standard of the drill-tooth to the lapped arms C at any desired vertical adjustment. A chute or conductor G', formed by bending a blank H' of sheet metal so as to provide the inclined bottom portion I' and the sides K', has an opening L' in its front side near its upper edge, which receives the head of the bolt A', and has openings near its rear corners, through which the bolt R passes, and thereby the said chute is attached to the front side of the frame. The rear side of the chute extends under the hopper and is curved, as at M', and adapted to fit under the seed-cylinder L, so that the seeds discharged from the latter will fall into the chute and be directed into the drill-tooth and by the latter into the furrow.

Arranged between the rear ends of the bars B is a cross-bar N', which has its end bent forward at right angles and secured to the arms B by bolts O'. Laterally-projecting marker-arms P' are pivotally bolted to the offset portions D by means of bolts R', and near the outer ends of said marker-arms are bolted the upper ends or standards of marker-teeth S' by means of pivotal bolts T'. The marker-arms may be swung inward over the frame, or the same may be extended outward beyond the sides of the frame to cause the markers S' to travel on the ground and form marking-furrows parallel with and on opposite sides of the furrow made by the drill-tooth, to serve for the guidance of the machine on the return-row. The roller G serves to fill the seed-furrow and to compress the earth above the seed.

Having thus described my invention, I claim—

1. The combination, in a seed-drill, of the frame, the shaft I, journaled therein and having the driving and supporting wheels K, and the seed-cylinder L, having seed cups or recesses of graduated sizes, the cross bars or bolts, the hollow block or casting supported and guided laterally thereon and having the discharge-opening adapted to register with the seed-cups of the cylinder, a set-screw extending through the laterally-adjustable block and bearing against one of the transverse bolts or bars, and the hopper supported on said block or casting, all arranged and operating substantially as and for the purpose set forth.

2. The seed-drill comprising the frame, the roller journaled in the rear end thereof, the shaft in the front end thereof having the driving and supporting wheels and the seed roller or cylinder, the cross-bolts connecting the frame, the hollow block or casting forming the bottom of and supporting the hopper, the same being secured to and laterally movable on cross-bolts and having the concavity in its lower side to receive the upper side of the seed-cylinder, the vertically-adjustable drill-tooth attached to the front end of the same, and the conductor or chute to convey seeds from the cylinder to the said drill-tooth, substantially as described.

3. The frame having the offset bars D and the planting mechanism, in combination with the marker-arms pivotally bolted to the offset arms and the marker-teeth pivotally bolted to the outer ends of said marker-arms, substantially as described.

4. The combination of the frame, the shaft I, having supporting-wheels K and the seed-cylinder L, provided with seed cups or recesses of graduated sizes, the transverse bars or bolts R S, the block or casting adjustable laterally upon said transverse bolts and having a set-screw bearing against one of said bolts and a discharge-opening, a hopper mounted upon said laterally-adjustable block, and the chute or conductor G', secured permanently to the frame by one of the transverse bolts, substantially as set forth.

In testimony that I claim the foregoing as my own I have hereto affixed my signature in presence of two witnesses.

WILLIAM HUGGINS.

Witnesses:
H. D. PEW,
C. VAN VLECK.